(12) United States Patent
Crowley

(10) Patent No.: US 11,730,073 B2
(45) Date of Patent: Aug. 22, 2023

(54) MOUNTING ASSEMBLY FOR A STEERABLE WHEEL WITH VARIABLE TRACK WIDTH

(71) Applicant: AGCO Corporation, Duluth, GA (US)

(72) Inventor: Mark Aron Crowley, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 826 days.

(21) Appl. No.: 16/693,969

(22) Filed: Nov. 25, 2019

(65) Prior Publication Data

US 2020/0163269 A1 May 28, 2020

Related U.S. Application Data

(60) Provisional application No. 62/772,215, filed on Nov. 28, 2018.

(51) Int. Cl.
*A01B 63/00* (2006.01)
*B62D 5/09* (2006.01)
*B60B 35/10* (2006.01)
*B62D 49/06* (2006.01)
*A01M 7/00* (2006.01)
*A01C 23/04* (2006.01)

(52) U.S. Cl.
CPC .......... *A01B 63/006* (2013.01); *B60B 35/109* (2013.01); *B60B 35/1045* (2013.01); *B60B 35/1054* (2013.01); *B62D 5/09* (2013.01); *B62D 49/0678* (2013.01); *A01C 23/047* (2013.01); *A01M 7/0042* (2013.01); *A01M 7/0082* (2013.01); *B60B 2900/351* (2013.01)

(58) Field of Classification Search
CPC .............. A01B 63/006; B60B 35/1045; B60B 35/1054; B60B 35/109; B60B 2900/351; B60B 35/1036; B62D 5/09; B62D 49/0678; B62D 7/06; B62D 9/00; B62D 5/12; B62D 49/0607; A01C 23/047; A01M 7/0042; A01M 7/0082; B60G 2200/44; B60G 2300/08; B60G 3/00
See application file for complete search history.

(56) References Cited

U.S. PATENT DOCUMENTS 2,099,194 A * 11/1937 Brown .................. B60B 35/109
                                                 180/906
3,023,561 A *  3/1962 Gustafson .............. A01D 34/63
                                                  56/13.6
(Continued)

FOREIGN PATENT DOCUMENTS

EP        2384908 A1    11/2011

OTHER PUBLICATIONS

UK Intellectual Property Office, Search Report prepared for UK Priority Application No. GB1820123.6, dated May 29, 2019.

*Primary Examiner* — Drew J Brown
*Assistant Examiner* — Timothy Wilhelm

(57) ABSTRACT

A wheel-mounting assembly for a utility vehicle includes a chassis and a wheel support assembly mounted to respective outboard ends of first and second telescopic axle assemblies. The first and second telescopic axle assemblies are laterally spaced from one another and are each secured to the chassis. The first and second telescopic axle assemblies each include a respective actuator arranged to control extension and retraction thereof for steering and track-width control.

19 Claims, 5 Drawing Sheets

(56) References Cited

U.S. PATENT DOCUMENTS

| | | | | |
|---|---|---|---|---|
| 3,642,073 A * | 2/1972 | Geurts | A01B 59/00 | 172/260.5 |
| 3,724,585 A * | 4/1973 | Conrad | B62D 7/1509 | 180/414 |
| 3,782,491 A * | 1/1974 | Herbenar | B60B 35/003 | 280/638 |
| 4,011,915 A * | 3/1977 | Anderson | A01B 35/24 | 172/705 |
| 4,040,643 A * | 8/1977 | Applequist | B60B 35/109 | 180/906 |
| 4,120,507 A * | 10/1978 | Miller | B62D 11/20 | 180/41 |
| 4,350,222 A * | 9/1982 | Lutteke | B62D 49/0678 | 180/209 |
| 4,364,581 A * | 12/1982 | Shoup | A01B 73/065 | 172/311 |
| 4,431,074 A * | 2/1984 | Langerud | B62D 55/084 | 180/9.48 |
| 4,496,004 A * | 1/1985 | Frase | A01B 73/067 | 172/383 |
| 4,607,716 A * | 8/1986 | Beck | A01B 69/004 | 172/6 |
| 5,039,129 A * | 8/1991 | Balmer | B60G 3/04 | 180/209 |
| 5,086,847 A * | 2/1992 | Meiners | A01B 63/22 | 280/43.23 |
| 5,121,808 A * | 6/1992 | Visentini | B60B 35/1018 | 301/128 |
| 5,209,319 A * | 5/1993 | Buell | B62K 25/005 | 280/283 |
| 5,282,644 A * | 2/1994 | Larson | B60B 35/1054 | 180/436 |
| 5,489,113 A * | 2/1996 | Torborg | B60B 35/109 | 301/128 |
| 5,489,114 A * | 2/1996 | Ward | B66F 11/046 | 180/209 |
| 5,975,215 A * | 11/1999 | Jensen | A01B 63/10 | 172/407 |
| 6,017,047 A * | 1/2000 | Hoose | F16F 9/58 | 280/279 |
| 6,036,201 A * | 3/2000 | Pond | F16F 9/06 | 280/5.514 |
| 6,139,045 A * | 10/2000 | Vandenbark | B60B 35/1054 | 180/209 |
| 6,145,610 A * | 11/2000 | Gallignani | B66C 23/62 | 180/906 |
| 6,199,769 B1 * | 3/2001 | Weddle | F16F 9/06 | 180/906 |
| 6,371,237 B1 * | 4/2002 | Schaffer | B62D 7/06 | 280/124.17 |
| 6,406,043 B1 * | 6/2002 | Balmer | B60B 35/1054 | 301/128 |
| 6,557,658 B1 * | 5/2003 | Enmeiji | B62D 7/1509 | 180/234 |
| 6,679,339 B1 * | 1/2004 | Steinlage | A01B 63/22 | 172/395 |
| 6,786,130 B2 * | 9/2004 | Steinlage | A01B 63/22 | 172/318 |
| 6,827,176 B2 * | 12/2004 | Bean | B60B 35/109 | 180/906 |
| 6,851,494 B2 * | 2/2005 | Harthauser | B62D 55/084 | 180/9.21 |
| 7,163,227 B1 * | 1/2007 | Burns | B62D 49/0607 | 301/128 |
| 7,168,717 B2 * | 1/2007 | Wubben | B62D 49/0678 | 280/124.157 |
| 7,188,680 B2 * | 3/2007 | Almen | A01B 59/042 | 172/397 |
| 7,526,908 B1 * | 5/2009 | Rice | A01D 57/00 | 56/192 |
| 7,669,675 B2 * | 3/2010 | Hagie | A01M 7/0042 | 180/22 |
| 7,837,207 B2 * | 11/2010 | Kremmin | B60G 3/01 | 280/5.514 |
| 7,954,583 B2 * | 6/2011 | Goers | B60B 35/1054 | 180/209 |
| 7,984,768 B2 * | 7/2011 | Schilling | A01B 23/06 | 172/566 |
| 8,042,817 B2 * | 10/2011 | Motebennur | B62D 49/0678 | 280/6.154 |
| 8,235,133 B2 * | 8/2012 | Friggstad | B60B 33/0015 | 16/35 R |
| 8,291,997 B2 * | 10/2012 | Kovach | A01B 21/08 | 172/395 |
| 8,376,078 B2 * | 2/2013 | Hiddema | B60B 35/001 | 180/209 |
| 8,534,686 B1 * | 9/2013 | Slawson | B62D 7/06 | 280/124.147 |
| 8,573,846 B2 * | 11/2013 | Mackin | B60B 35/1054 | 301/128 |
| 8,635,962 B2 * | 1/2014 | Schilling | A01C 7/203 | 111/163 |
| 8,813,864 B2 * | 8/2014 | Layton | A01B 63/004 | 172/311 |
| 8,985,234 B2 * | 3/2015 | Gadzella | A01B 63/24 | 172/705 |
| 9,079,470 B2 * | 7/2015 | Slawson | B62D 49/0607 | |
| 9,148,988 B2 * | 10/2015 | Baker | A01B 63/16 | |
| 9,156,312 B1 * | 10/2015 | Ruggeri | B60B 35/122 | |
| 9,180,747 B2 * | 11/2015 | Slawson | A01B 76/00 | |
| 9,259,986 B2 * | 2/2016 | Slawson | B62D 5/14 | |
| 9,290,074 B2 * | 3/2016 | Slawson | B60G 3/01 | |
| 9,296,273 B2 * | 3/2016 | Slawson | B60G 15/12 | |
| 9,358,836 B2 * | 6/2016 | David | B60B 35/10 | |
| 9,554,500 B2 * | 1/2017 | Smith | A01B 63/22 | |
| 9,681,598 B2 * | 6/2017 | Anderson | A01B 63/22 | |
| 9,723,788 B2 * | 8/2017 | Bucharzewski | A01D 89/004 | |
| 9,868,462 B2 * | 1/2018 | Mannering | B62D 55/10 | |
| 9,883,623 B2 * | 2/2018 | Koch | A01B 63/1145 | |
| 9,950,584 B2 * | 4/2018 | Slawson | B60G 17/005 | |
| 10,004,171 B2 * | 6/2018 | Ballu | B60B 35/1054 | |
| 10,226,965 B1 * | 3/2019 | Schwalbe | B60B 35/109 | |
| 10,251,326 B2 * | 4/2019 | Andrews | A01B 61/046 | |
| 10,368,473 B2 * | 8/2019 | Treinen | B60P 3/30 | |
| 10,517,285 B2 * | 12/2019 | Crowley | B60G 3/01 | |
| 10,518,580 B2 * | 12/2019 | Moen | B60B 35/109 | |
| 10,542,656 B2 * | 1/2020 | Blunier | A01B 63/002 | |
| 10,556,476 B2 * | 2/2020 | Dames | B60G 7/001 | |
| 10,562,364 B2 * | 2/2020 | Crook | B60B 35/1054 | |
| 10,603,955 B2 * | 3/2020 | Abramov | B60B 35/1036 | |
| 10,638,653 B2 * | 5/2020 | Anderson | A01B 63/22 | |
| 10,710,405 B2 * | 7/2020 | Roach | B60B 35/109 | |
| 10,766,329 B2 * | 9/2020 | Slawson | B60G 17/0165 | |
| 10,773,565 B2 * | 9/2020 | Slawson | B62D 49/0678 | |
| 11,104,197 B2 * | 8/2021 | Stapelbroek Trennepohl | B60G 17/00 | |
| 11,166,402 B2 * | 11/2021 | Bauman | A01B 63/32 | |
| 11,197,411 B2 * | 12/2021 | Bassett | A01C 7/203 | |
| 11,279,400 B1 * | 3/2022 | Eaton | B60B 35/1054 | |
| 2004/0129491 A1 * | 7/2004 | Bean | B60B 35/1054 | 180/21 |
| 2010/0075727 A1 * | 3/2010 | Goers | A01D 41/12 | 280/42 |
| 2010/0283218 A1 | 11/2010 | Coers et al. | | |
| 2011/0049263 A1 * | 3/2011 | Vander Zaag | A01B 63/22 | 280/43.17 |
| 2012/0241230 A1 * | 9/2012 | Vidal | B60G 3/01 | 180/58 |
| 2013/0069336 A1 * | 3/2013 | Horsch | B60G 3/01 | 280/124.154 |
| 2015/0102570 A1 | 4/2015 | Slawson | | |
| 2015/0102572 A1 * | 4/2015 | Slawson | B60G 11/27 | 180/417 |
| 2017/0355243 A1 * | 12/2017 | Albert | B60G 17/0272 | |
| 2018/0092286 A1 * | 4/2018 | Anderson | A01B 63/22 | |
| 2018/0250997 A1 * | 9/2018 | Slawson | B60G 17/005 | |
| 2019/0191614 A1 * | 6/2019 | Hafvenstein | A01M 7/0082 | |

(56) References Cited

U.S. PATENT DOCUMENTS

2020/0053944 A1* 2/2020 Sivinski .............. A01C 23/047
2021/0251126 A1* 8/2021 Pannell ............... A01B 27/005
2021/0400861 A1* 12/2021 de Carvalho ........ A01B 63/006

* cited by examiner

MOUNTING ASSEMBLY FOR A STEERABLE WHEEL WITH VARIABLE TRACK WIDTH

CROSS-REFERENCE TO RELATED APPLICATION

This application claims the benefit of the filing date of U.S. Provisional Patent Application 62/772,215, "Mounting Assembly for a Steerable Wheel with Variable Track Width," filed Nov. 28, 2018, the entire disclosure of which is incorporated herein by reference.

FIELD

The disclosure relates to utility vehicles having variable track width, such as agricultural row crop sprayers and spreaders. In particular, the disclosure relates to a steering mechanism for steerable wheels mounted to such vehicles that also facilitates variable track-width functionality.

BACKGROUND

Some agricultural vehicles are configured to be operated in fields among row crops. Application machines such as self-propelled or trailed sprayers, for example, may have wheels configured to pass between crop rows and a spray boom that extends outwardly from the vehicle to spray the crop as the machine travels through the field. In order to avoid damaging the crops as the vehicle moves through the field, each of the wheels must have the proper width to travel between the rows, and the track width (the lateral distance between the wheels) must match row spacing or predefined "tramlines" so that the wheels do not damage the growing crop.

Many agricultural sprayers on the market today offer functionality to change the track width to meet the requirements of the task in hand. Various different mechanisms exist to deliver this functionality. One known system involves wheel support assemblies being mounted to a vehicle chassis by a telescopic mechanism. U.S. Pat. No. 9,290,074, "Machine Suspension and Height Adjustment," issued Mar. 22, 2016, discloses such a telescopic arrangement, the contents of which are incorporated herein by reference. FIG. 5 of U.S. Pat. No. 9,290,074 shows a telescoping axle arrangement with an outer axle 28 secured to a chassis and an inner axle 30 slidingly engaged with the outer axle allowing the wheel to shift transversely relative to the longitudinal axis of the chassis. The outer axle and inner axle support the weight of the chassis on the wheel. The wheel is carried on a wheel support assembly which is pivotably mounted to an outboard end of the inner axle to permit steering movement. U.S. Pat. No. 9,290,074 further discloses, such as in FIGS. 22 through 26, a steering actuator 416 mounted to the inner axle to control steering of the wheel.

BRIEF SUMMARY

In accordance with one aspect of the disclosure, a wheel-mounting assembly for a utility vehicle comprises a chassis, a wheel support assembly, and first and second telescopic axle assemblies. The wheel support assembly is mounted to respective outboard ends of the first and second telescopic axle assemblies. The first and second telescopic axle assemblies are laterally spaced from one another and are each secured to the chassis. The first and second telescopic axle assemblies each comprise an actuator arranged to control extension and retraction of the axles assemblies for both steering and track width control.

The disclosure combines a track width adjustment mechanism with a steering mechanism thereby advantageously eliminating the need for dedicated steering apparatus and saving on part count and assembly cost. The dual telescopic axle arrangement also provides improved robustness in construction and operation as compared to a single-axle arrangement.

In one embodiment, the first and second axle assemblies are aligned parallel to one another so that simultaneous extension or retraction of the telescopic axle assemblies (during track width adjustment for example) does not alter the spacing at the outboard ends, thus maintaining a constant steering angle.

In one embodiment, the outboard end of the first axle assembly is coupled to the wheel support assembly by a link arm, which is connected at a first end to the first axle assembly by a first pivotable connection and at a second end to the wheel support assembly by a second pivotable connection. The outboard end of the second axle assembly is coupled to the wheel support assembly by a third pivotable connection. One of the first and second pivotable connection may comprise a ball-and-socket joint to facilitate free angular movement of the wheel support assembly.

In one embodiment, at least one of the first and second telescopic axle assemblies comprises an outer axle portion fixed to the chassis, and an inner axle portion slideably received by the outer axle portion. The outer axle portion may comprise a plurality of bearings secured within an outer tube, wherein the bearings receive and support the inner axle portion in a sliding relationship. The outer tube may be of a square or circular section. The bearings may each comprise an adjustable pillow block that allows for adjustment in response to wear over time.

In one arrangement, the inner axle portion comprises a hydraulic actuator. Advantageously, this provides a compact arrangement wherein the actuator is integrated into the envelope of the outer axle portion. The hydraulic actuator comprises a piston that is preferably connected to the outer axle portion or chassis. As such, forces from the hydraulic actuator are exerted directly between the chassis and the wheel-mounting assembly.

In an alternative embodiment the inner axle portion comprises a tubular member, and the respective actuator comprises a hydraulic actuator connected between the tubular member and the outer axle portion. The hydraulic actuator may be mounted to an outside surface of the tubular member. Although not as compact as certain embodiments, this arrangement provides for greater accessibility to the actuator for servicing.

The actuators may be, for example, electric or pneumatic actuators.

The disclosure lends itself well to utility vehicles and especially those adapted for use in agriculture for applying inputs to crops, such as sprayers and spreaders. In particular, the disclosure is well suited to implementation in sprayers and spreaders having high-clearance lift mechanisms associated with the wheel support assemblies.

In one example implementation of the disclosure in a utility vehicle, a steering control system is provided and arranged to control steering movement of the wheel support assembly with respect to the chassis. In response to steering control commands, the steering control system is configured to simultaneously extend a first of the actuators and retract a second of the actuators so as to pivot the wheel support assembly around a steering axis. Using the same hardware, the track width may be increased in response to a track-increase command, wherein the steering control system is configured to simultaneously extend both actuators so as to move the wheel support assembly further from the chassis. Conversely, the track width may be decreased in response to a track-decrease command, wherein the steering control system is configured to simultaneously retract both actuators so as to move the wheel support assembly closer to the chassis.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
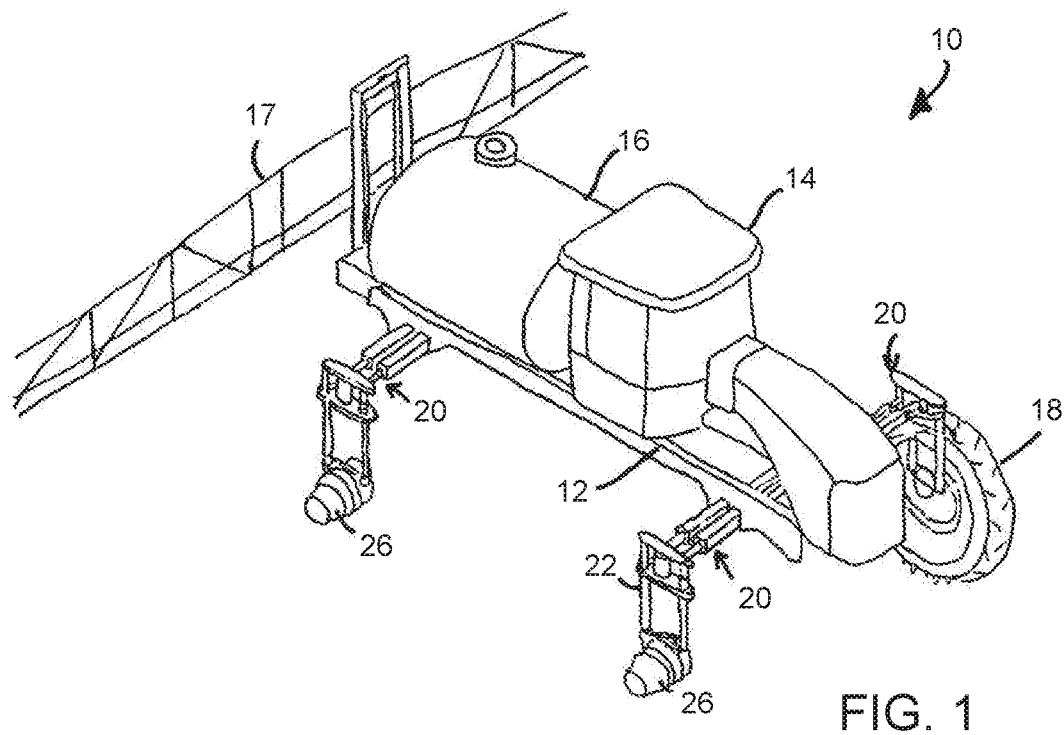
FIG. 1 is a perspective view of a portion of an agricultural sprayer, shown with two of the wheels omitted to illustrate the wheel-mounting assemblies.

All references cited herein are incorporated herein in their entireties. If there is a conflict between definitions herein and in an incorporated reference, the definition herein shall control.

The illustrations presented herein are not actual views of any header or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

With reference to FIG. 1, a self-propelled agricultural sprayer 10 may include a frame or chassis 12, a driver's cab 14, a storage tank 16, and a spray boom assembly 17 for applying liquid plant-protection products. Although only one wheel 18 is shown in FIG. 1, four wheels 18 are typically mounted to the chassis 12 by respective wheel-mounting assemblies 20, which are constructed in accordance with principles of the disclosure and will be described in more detail below.

Although an agricultural row crop sprayer 10 is illustrated, the disclosure can be applied to other agricultural utility vehicles, especially those having high-clearance lift mechanisms that carry the chassis at sufficient height to prevent damage to row crops over which the chassis travels.

Other examples of utility vehicles to which the disclosure can be applied, by way of example only, include self-propelled material spreaders including air spreaders for granular fertilizer. Furthermore, the disclosure is not limited to self-propelled machines, and may also be applied to steerable trailed implements for example, especially those used in agriculture but not exclusively so. Neither is the disclosure limited to agricultural vehicles, but may find application in other fields.

Before a more detailed description of the wheel-mounting assemblies 20 is given, the principals of high-clearance lift mechanisms will be briefly discussed to provide a more complete understanding of the sprayer 10 illustrated. With reference to both FIGS. 1 and 2, each wheel-mounting assembly 20 includes a wheel support assembly 22. Each wheel-mounting assembly 20 in the illustrated embodiment may be the same for each and every wheel, but reference will be made to the singular only hereinafter.

Each wheel support assembly 22 includes a hub portion 24, which carries a drive motor 26 (shown in FIG. 1 only) drivingly connected to the wheel 18. The drive motor 26 may be hydraulic or electric and derives its power from a prime mover located on the chassis 12. The motor 26 rotates to provide forward and reverse propulsive forces to the wheels 18 in a known manner.

Each wheel support assembly 22 may be provided with a mechanism to facilitate vertical height adjustment of the chassis 12 with respect to the hub portion 24 and the associated wheel 18. U.S. Pat. No. 9,290,074, incorporated by reference above, discloses a number of examples of mechanisms to provide the variable height functionality of the wheels support assemblies 22.

It should be appreciated that the wheel support assembly 22 illustrated in the drawings is merely one example, and the precise construction thereof may vary. Furthermore, the disclosure is also applicable to utility vehicles without variable height functionality. In essence, the wheel support assembly 22 provides a rigid structure to which a wheel can be mounted to support the chassis 12. Although the wheel support assembly 22 may allow for vertical adjustment of the supported wheel 18 with respect to the chassis 12, the transverse position of the wheel support assembly 22 with respect to the chassis 12 dictates the track separation and steering angle of the wheel 18.

Turning to the construction of the wheel-mounting assembly 20, the wheel support assembly 22 is mounted to outboard ends 28 of first and second telescopic axle assemblies 31, 32. Each telescopic axle assembly 31, 32 is elongate and extends transversely between the chassis 12 and the associated wheel support assembly 22.

Figure 2:
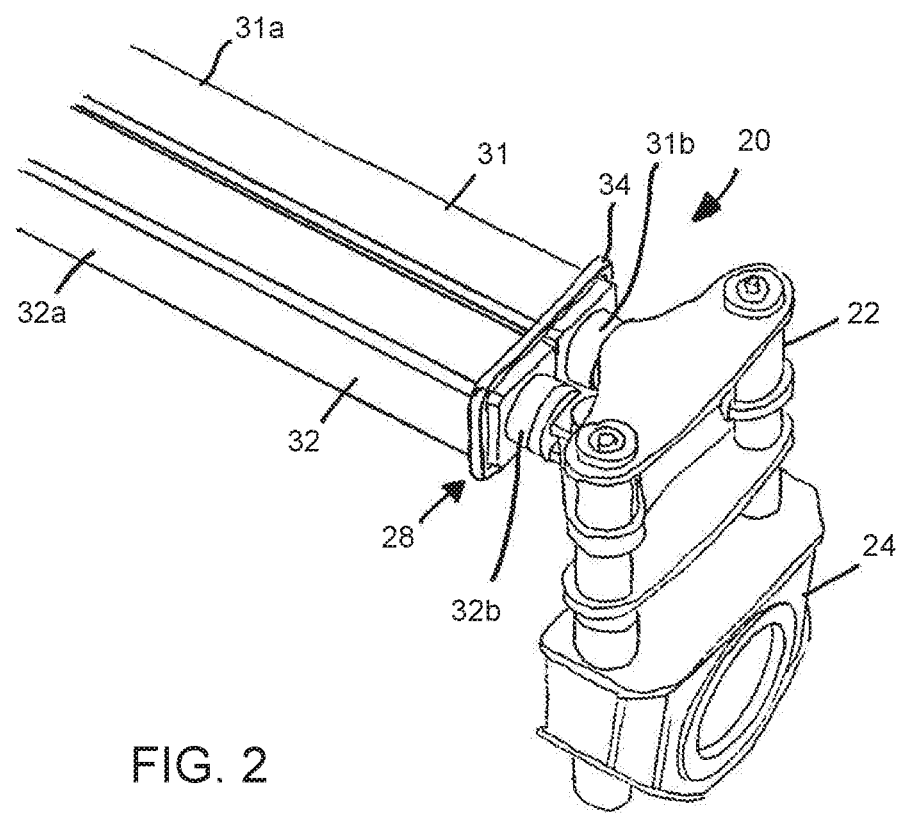
FIG. 2 is a perspective view of the front right wheel-mounting assembly of the sprayer of FIG. 1.
Figure 3:
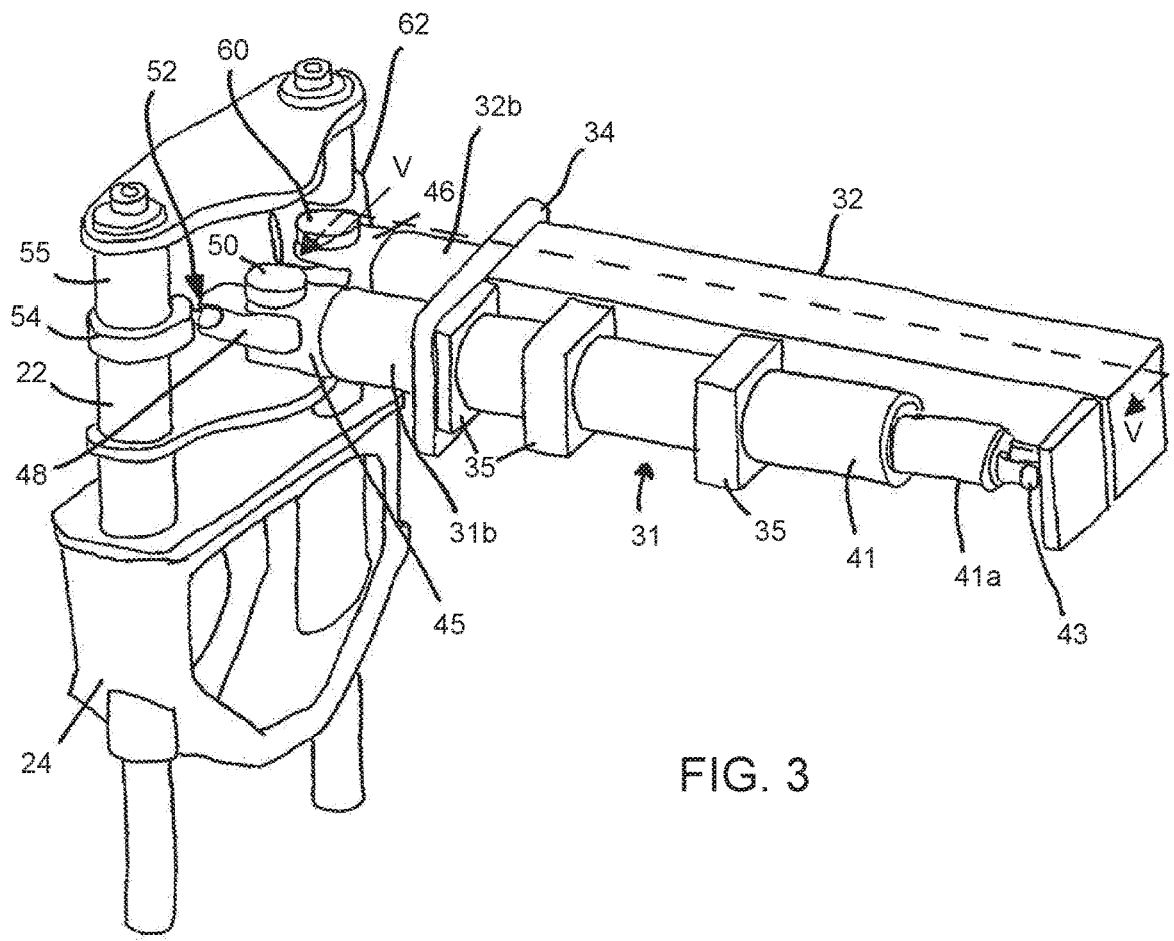
FIG. 3 is a perspective view of the wheel-mounting assembly of FIG. 2 shown with one outer tube omitted to reveal otherwise-hidden components of a telescopic axle assembly thereof.

First telescopic axle assembly 31 is laterally spaced from second telescopic axle 32, forwardly thereof with respect to the direction of travel of sprayer 10. In other words, the first telescopic axle assembly 31 is disposed in front of the second telescopic axle assembly 32. As best seen in FIGS. 2 and 3, the telescopic axle assemblies 31, 32 are aligned parallel to one another in a side-by-side relationship. However, it is envisaged that steering and track width functionality provided thereby can also be delivered with an alternative construction in which the telescopic axle assemblies are not aligned parallel to one another.

Both telescopic axle assemblies 31, 32 are secured to the chassis 12 by suitable attachment mechanisms which provide a rigid and fixed structural relationship. In one example, a cut out may be provided in a longitudinal beam of chassis 12 to accept the telescopic axle assemblies 31, 32 which are then fixed in place by welding or bolting. The first and second telescopic axle assemblies 31, 32 may also be secured to one another at a distance from the chassis to provide suitable rigidity. An example of this is illustrated in FIGS. 2 and 3, in which an end plate 34 is secured between both axle assemblies 31, 32 to provide rigidity.

Figure 5:
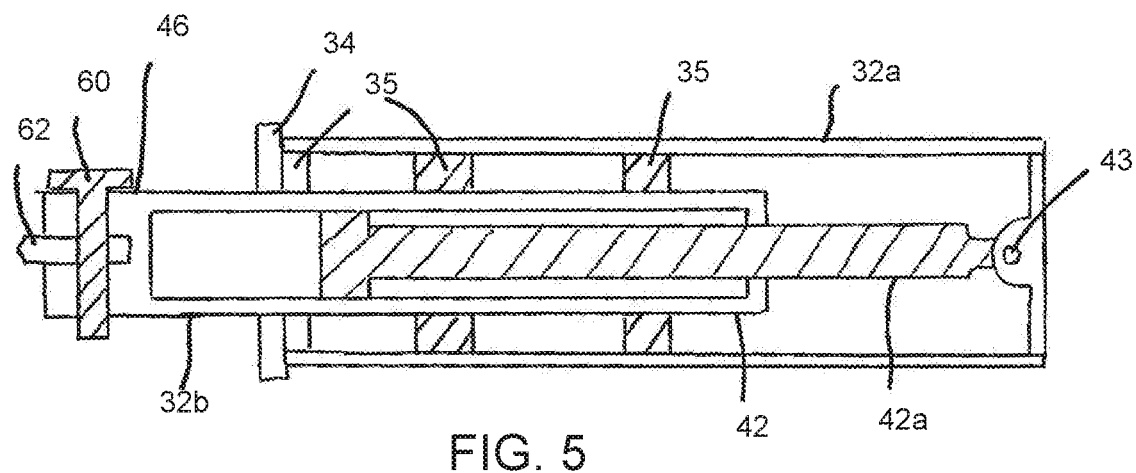
FIG. 5 is a view of a vertical section along the line V-V shown in FIG. 3.

Each of the axle assemblies 31, 32 includes an outer axle portion 31a, 32a and an inner axle portion 31b, 32b. Each inner axle portion 31b, 32b is slideably received by the associated outer axle portion 31a, 32a in a telescoping manner. The sliding relationship is along the axis of the axle assembly 31, 32 and provides for extension and retraction of the axle assemblies 31, 32 which, in turn, allows for the control of both steering and track-width adjustment, which will be described in more detail below. Each outer axle portion 31a, 32a may comprise a tubular member of square cross-section secured to the chassis 12. Inside the tubular members may be disposed bearing blocks 35, of which three are shown in FIGS. 3 and 5. The bearing blocks 35 are secured by known means inside the respective tubular members. In alternative, embodiments more or fewer than three bearing blocks may be present.

The inner axle portions 31b, 32b are slidingly received in the respective sets of bearing blocks 35 so as to allow for telescoping extension and retraction with respect to the outer axle portions 31a, 32a.

In this illustrated embodiment, each of the inner axle portions 31b, 32b comprises part of a hydraulic actuator 41, 42. Best seen in FIGS. 3 and 5, each of the first and second hydraulic actuators 41, 42 comprises a piston rod 41a, 42a slidingly received in a cylindrical housing, which forms the inner axle portions 31b, 32b. The cylinder housings that form the inner axle portions 31b, 32b are slidingly received and supported by the bearing blocks 35. Each piston rod 41a, 42a extends from the associated cylinder housing in a transverse direction towards the chassis 12. The piston rods 41a, 42a are coupled indirectly to the chassis 12 via outer axle portions 31a, 32a by a pin connection 43. Alternatively, the piston rods 41a, 42a may be coupled directly to the chassis 12.

In an alternative embodiment that is not illustrated, the actuators may be 'reversed' wherein the cylinder housing is mounted in a fixed positional relationship to the chassis 12 and the piston rods form the inner axle portions that are supported on bearings and upon which the wheel support assembly 22 is mounted.

Turning back to the illustrated embodiment, it will appreciated from FIGS. 3 and 5 that extension and retraction of the hydraulic actuators 41, 42 causes the inner axle portions 31b, 32b to telescope out of and into the outer axle portions 31a, 32a as the piston rods 41a, 42a exert a force upon the chassis 12.

Figure 4:
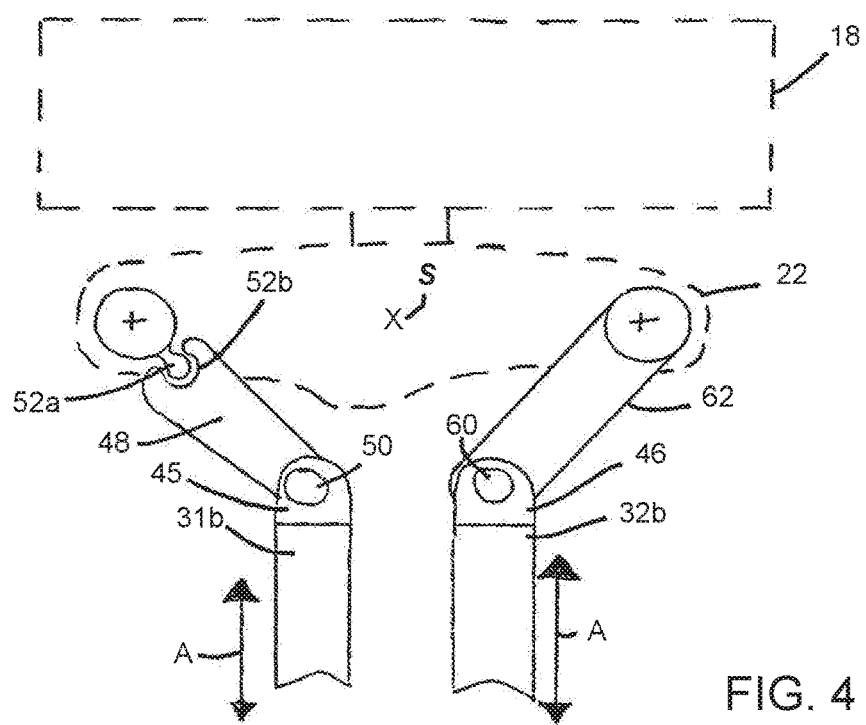
FIG. 4 is a schematic plan view of an outboard end of the wheel-mounting assembly of FIG. 2 illustrating a linkage arrangement between the axle assemblies and the wheel support assembly.

The outboard end of each of inner axle portions 31b, 32b is provided with a respective clevis 45, 46 secured to the end of the cylinder housing or integrated therewith. The wheel support assembly 22 is mounted to the devises 45, 46 as is best seen in FIGS. 3 and 4.

Clevis 45 on the outboard end of the first axle assembly 31 is coupled to the wheel support assembly 22 via a link arm 48. The link arm 48 is pivotally connected to the first axle assembly 31 by a first pivotable connection 50 provided by a pin inserted through the clevis 45. Link arm 48 can thus pivot with respect to first inner axle portion 31b around pin 50. The link 48 is connected at a second end to the wheel support assembly 22 by a ball-and-socket joint 52. Joint 52 includes a ball 52a which is integral with a collar 54 that is fixed to an upright 55 of wheel support assembly 22. Joint 52 also includes a socket 52b which is integrally formed in the second (outboard) end of link arm 48. First pivotable connection 50 and ball-and-socket joint 52 provide a dual axis hinge connection between the first axle assembly 31 and the wheel support assembly 22.

In an alternative embodiment, the ball joint 52 is replaced with a pin joint.

Turning back to the illustrated embodiment, clevis 46 provided on the outboard end of second axle assembly 32 is coupled to the wheel support assembly 22 by a third pivotable connection 60, which is provided by a pin inserted through the clevis 46. In more detail, a crank arm 62 is rigidly connected to the wheel support assembly 22 extending towards the chassis 12 and serves as an attachment point for the second axle assembly 32. The pin provides the pivotable connection 60 and couples the crank arm to the clevis 46.

The wheel support assembly 22 is, therefore, mounted upon the outboard ends of first and second telescopic axle assemblies 31, 32 by pivotable joints 50 and 60. These joints support the weight or load of the vehicle 10 upon the wheel support assembly 22 and are constructed with sufficient strength and robustness accordingly. Thus, each of the pivotable joints 50 and 60 and the telescopic axle assemblies 31, 32 may be load-bearing, and may transfer weight of the chassis 12 to the wheel support assembly 22. Extension and retraction of axle assemblies 31, 32 is used to control the steering angle of the wheel support assembly 22 with respect to chassis 12. With reference to FIG. 4 arrows 'A' illustrate the direction of extension and retraction.

Figure 6:
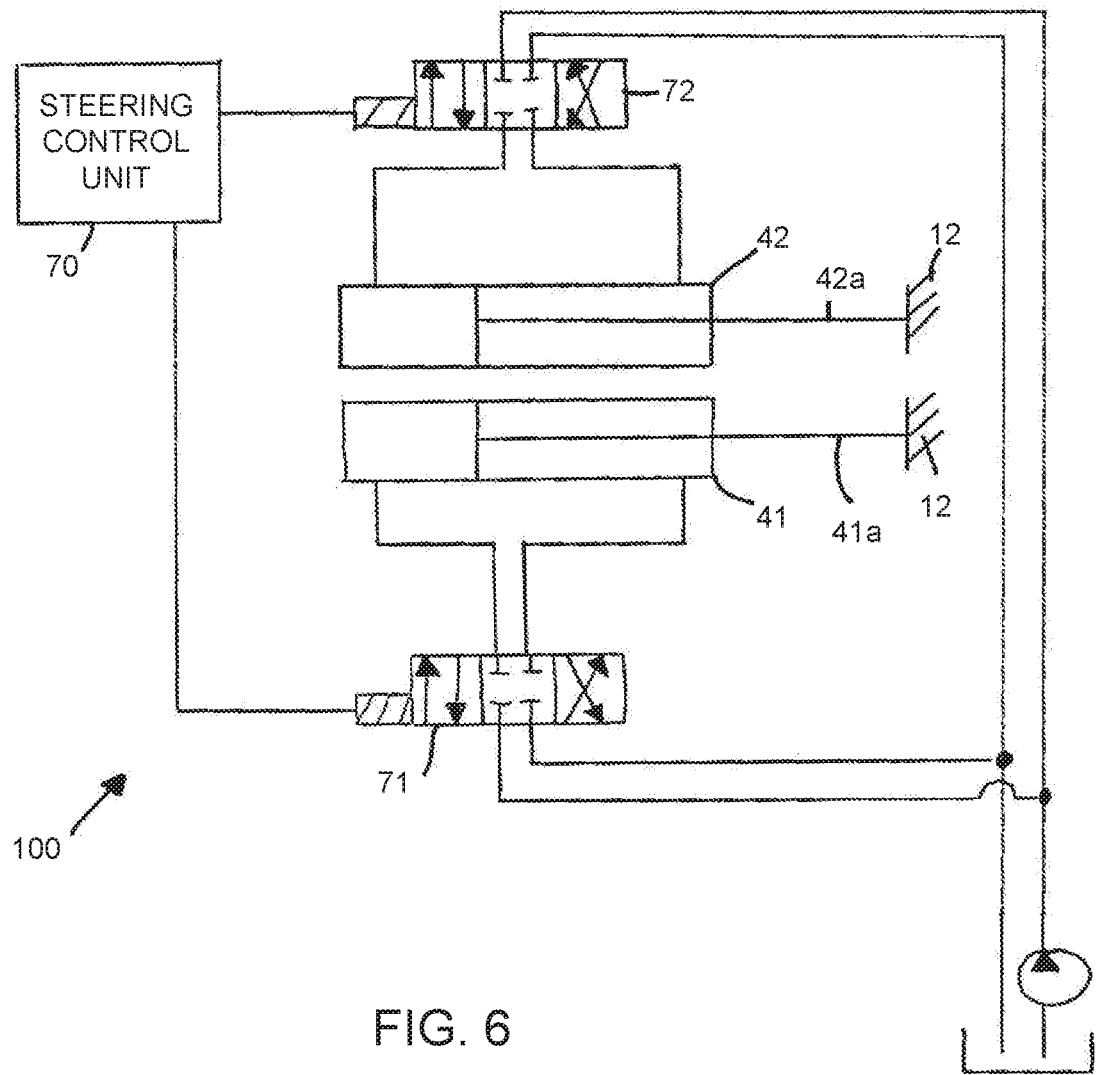
FIG. 6 is a schematic diagram of part of a steering control system for controlling steering and track-width adjustment in conjunction with the wheel-mounting assembly of FIG. 2.
Figure 7:
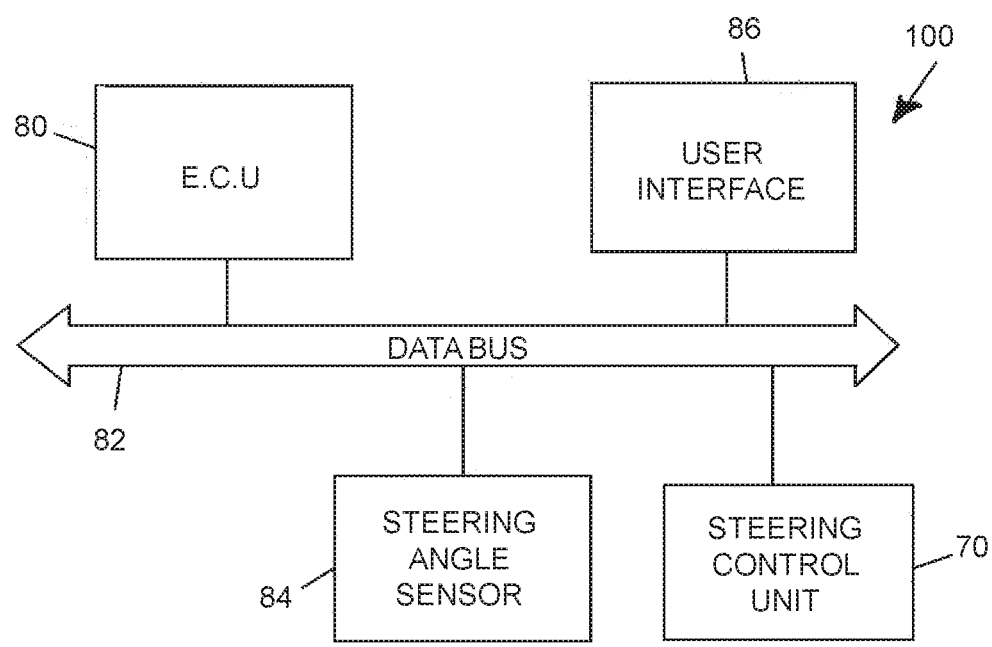
FIG. 7 is a simplified block diagram of the steering control system of FIG. 6.

Turning to FIGS. 6 and 7, the sprayer 10 includes a steering control system 100 arranged to control steering movement of the wheel support assemblies 22 with respect to the chassis 12. A steering control unit 70 is electrically connected to two directional control valves 71, 72 that each serve to control the delivery of pressurized hydraulic fluid to cylinders 41, 42. FIG. 6 shows a simplified schematic hydraulic circuit associated with one wheel support assembly 20. The steering control unit 70 may also be connected to further hydraulic control valves for steering of the other wheels 18.

The steering control unit 70 is in communication with an electronic control unit (ECU) 80 via a data bus 82, either in a wired or wireless connection. A steering angle sensor 84 (FIG. 7) is in electrical communication with ECU 80. The steering angle sensor 84 detects the real-time steering orientation of wheel support assembly 22. In one embodiment, the steering angle sensor 84 includes a sensor associated with each of the two hydraulic actuators 41, 42 to detect the actual or relative positions of the piston arms 41a, 42a. The steering angle may for example may be derived from measuring the absolute positions of both hydraulic actuators 41, 42.

The ECU 80 comprises control circuitry which may be embodied as custom-made or commercially available processor, a central processing unit, or an auxiliary processor among several processors, a semi-conductor based microprocessor (in the form of a microchip), a macro processor, one or more application-specific integrated circuits, a plurality of suitably configured digital logic gates, and/or other well-known electrical configurations comprising discrete elements both individually and in various combinations to coordinate the overall operation of the sprayer 10.

The ECU 80 further comprises memory. The memory may include any one of a combination of volatile memory elements and non-volatile memory elements. The memory may store a native operating system, one or more native applications, emulation systems, emulated applications for any of a variety of operating systems and/or emulated hardware platforms, emulated operating systems, etc. For example, control of the actuators 41, 42 may be implemented through software or firmware executing on a processor of the control circuitry. The memory may be separate from the ECU, or may be omitted.

A user interface device 86 may be in communication with the ECU 80 and may generate steering control commands and track-change commands in response to a user input. For example, the user interface 86 may include a steering wheel, buttons, and/or joysticks.

Turning back to FIG. 4, in response to steering control commands, the steering control system 100 is configured to simultaneously extend one of the hydraulic actuators 41, 42 and retract the other of the actuators 41, 42 so as to cause pivoting of the wheel support assembly 22 (and the wheel 18) around a steering axis which may be positioned at '5'. The position of steering axis '5' may change depending upon the relative extension and retraction movements of cylinders 41, 42. In other words, although a steering axis '5' proximate to the center line of wheel 18 is preferred, the position of steering axis '5' may be altered by varying the relative movements of cylinders 41, 42. For example, if the steering control system 100 maintains the second hydraulic actuator 42 in a constant position while controlling first hydraulic actuator 41 to steer the wheel 18, the steering axis '5' would be coincident with the third pivotable joint provided around pin 60.

The steering control system 100 is also utilized to adjust the track width of sprayer 10 in response to track-adjustment commands received via user interface 86. For example, in response to a track-increase command, the steering control system 100 causes both hydraulic actuators 41, 42 to simultaneously extend, thus pushing wheel support assembly 22 further from chassis 12. Conversely, in response to a track-decrease command, the steering control system 100 causes both hydraulic actuators 41, 42 to retract. During adjustment of the track width, it should be appreciated that the steering angle may be kept constant while the vehicle is in motion.

The ECU 80 may be programmed with steering control algorithms to respond to steering control commands in a number of different ways which will be apparent to a person skilled in the art. In addition to manual steering control with signals received directly from an operator as mentioned above, the steering control system 100 may optionally operate in an automatic mode in response to automatically-generated guidance signals.

Figure 8:
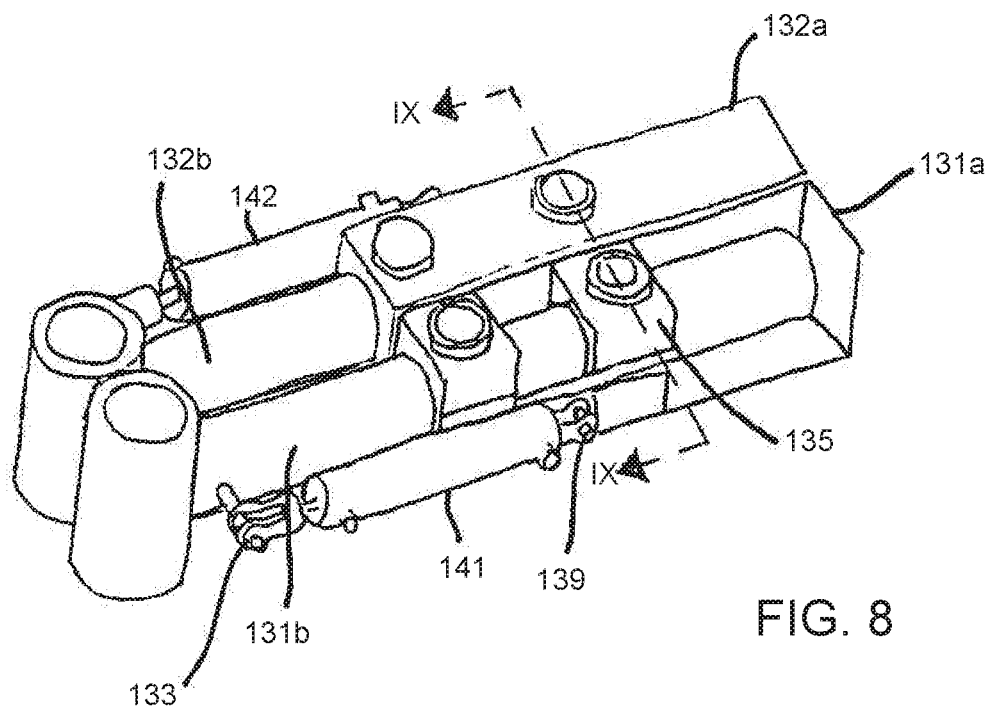
FIG. 8 is a perspective view of another wheel-mounting assembly.
Figure 9:
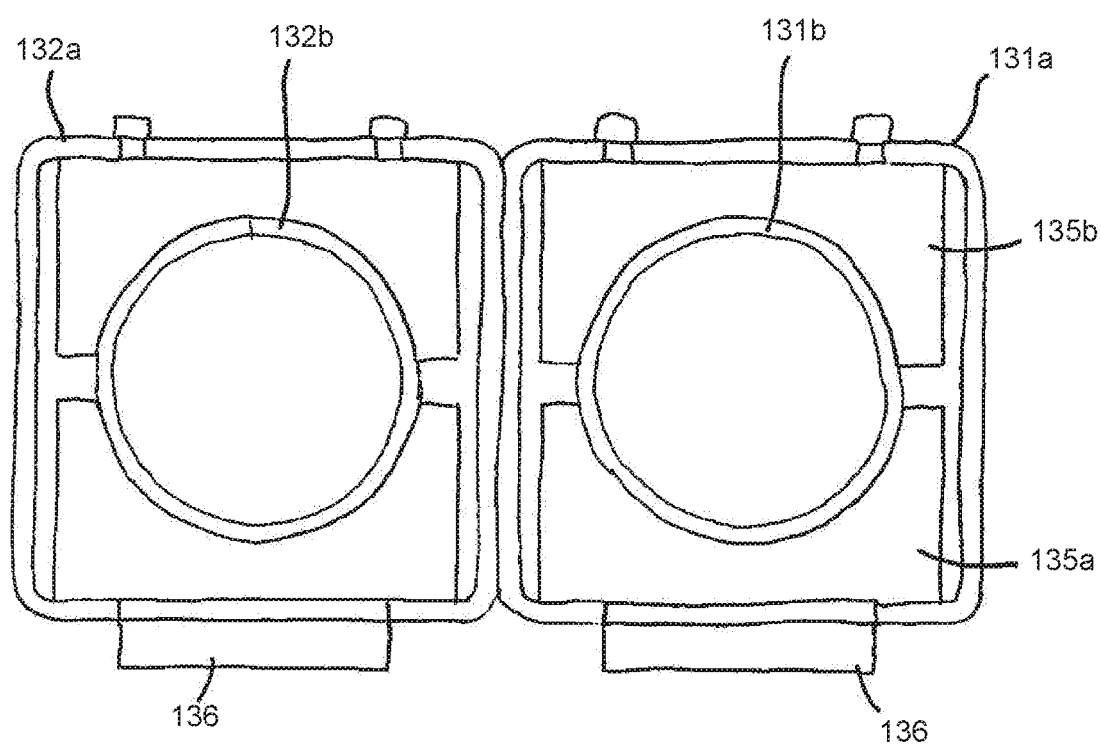
FIG. 9 is a view of a vertical section along the line IX-IX shown in FIG. 8.

With reference to FIGS. 8 and 9, a second embodiment is illustrated in which the internal actuators 41, 42 of the first embodiment are replaced with external actuators 141, 142. In this embodiment, the inner axle portions each include tubular members 131b, 132b slidingly received in adjustable pillow blocks 135 secured inside outer axle portions 131a, 132a. The outer axle portion 131a, 132a are again of a square cross section, and the inner axle 131b, 132b are of a circular cross section.

The adjustable pillow blocks 135 each include a lower portion 135a and an upper portion 135b. Screw adjustable members 136 are threaded in to the underside of outer axle portions 131a, 132a and are tightened as required through the lifetime of the bearing blocks 135 so as to adjust for wear. The adjustable pillow blocks 135 may also be employed in the embodiment shown in FIGS. 2 through 6, replacing the conventional bushing blocks 35.

Turning back to FIG. 8, the first hydraulic actuator 141 is connected on an external side of telescopic axle assembly 131 and is coupled between the tubular inner axle portion 131*b* at connection 133 and the outer axle portion 131*a* at connection 139. The second hydraulic actuator 142 is connected to the second telescopic axle assembly 132 in a similar manner.

Extension and retraction of hydraulic cylinders 141, 142 is controlled by the steering control unit 70 in a similar manner to that described above and, as such, controls extension and retraction of first and second telescopic axle assemblies 131, 132 to control steering and track-width adjustment.

Although the wheel support assembly 22 is not shown in FIG. 8, it should be understood that suitable pivotable connections provided between the inner axle portions 131*b*, 132*b* and the wheel support assembly can be achieved using mechanisms known in the art or those shown and described above.

In summary, a wheel-mounting assembly for high-clearance utility vehicles, especially agricultural applicator machines, may be used for each or only some of the steerable wheels on the vehicle, wherein each wheel-mounting assembly shares a similar construction and control system.

Additional non-limiting example embodiments of the disclosure are described below.

Embodiment 1

A wheel-mounting assembly for a utility vehicle comprising a chassis, the wheel-mounting assembly comprising first and second telescopic axle assemblies laterally spaced from one another and each secured to the chassis, wherein the first and second telescopic axle assemblies each comprise an actuator arranged to control extension and retraction of a respective telescopic axle assembly; and a wheel support assembly mounted to outboard ends of each of the first and second telescopic axle assemblies.

Embodiment 2

The assembly of Embodiment 1, wherein the first and second telescopic axle assemblies are aligned parallel to one another.

Embodiment 3

The assembly of Embodiment 1 or Embodiment 2, wherein the outboard end of the first axle assembly is coupled to the wheel support assembly by a link arm which is connected at a first end to the first telescopic axle assembly by a first pivotable connection and at a second end to the wheel support assembly by a second pivotable connection, and the outboard end of the second telescopic axle assembly is coupled to the wheel support assembly by a third pivotable connection.

Embodiment 4

The assembly of Embodiment 3, wherein one of the first pivotable connection and the second pivotable connection comprises a ball-and-socket joint.

Embodiment 5

The assembly of any one of Embodiment 1 through Embodiment 4, wherein at least one of the first and second telescopic axle assemblies comprises an outer axle portion and an inner axle portion slideably received by the outer axle portion.

Embodiment 6

The assembly of Embodiment 5, wherein the outer axle portions of each of the first and second telescopic axle assemblies are fixed to the chassis.

Embodiment 7

The assembly of Embodiment 5 or Embodiment 6, wherein the outer axle portions each comprise a plurality of bearings secured within an outer tube, wherein the bearings receive and support a respective inner axle portion in a sliding relationship.

Embodiment 8

The assembly of Embodiment 7, wherein the bearings each comprise an adjustable pillow block.

Embodiment 9

The assembly of any one of Embodiment 5 through Embodiment 8, wherein the inner axle portion comprises a portion of a hydraulic actuator.

Embodiment 10

The assembly of Embodiment 9, wherein the hydraulic actuator comprises a piston connected to the outer axle portion or the chassis.

Embodiment 11

The assembly of any one of Embodiment 5 through Embodiment 10, wherein the inner axle portion comprises a tubular member, and wherein the respective actuator comprises a hydraulic actuator connected between the tubular member and the outer axle portion.

Embodiment 12

The assembly of Embodiment 11, wherein the hydraulic actuator is mounted to an outside surface of the tubular member.

Embodiment 13

The assembly of any of Embodiment 1 through Embodiment 12, wherein each of the first and second telescopic axle assemblies are configured to transfer a portion of a weight of the chassis to the wheel support assembly.

Embodiment 14

The assembly of any of Embodiment 1 through Embodiment 13, wherein the first telescopic axle assembly is rigidly fixed to the second telescopic axle assembly.

Embodiment 15

A utility vehicle comprising a chassis and a plurality of the wheel-mounting assemblies of any of Embodiment 1 through Embodiment 14.

Embodiment 16

The utility vehicle of Embodiment 15, further comprising a steering control system arranged to control steering movement of the wheel support assembly with respect to the chassis, wherein, in response to a steering control command, the steering control system is configured to simultaneously extend a first of the actuators and retract a second of the actuators so as to pivot the wheel support assembly around a steering axis.

Embodiment 17

The utility vehicle of Embodiment 16, wherein, in response to a track-increase command, the steering control system is configured to simultaneously extend both actuators to move the wheel support assembly further from the chassis.

Embodiment 18

The utility vehicle of any one of Embodiment 15 through Embodiment 17, wherein the utility vehicle comprises a self-propelled agricultural sprayer.

Embodiment 19

A method of adjusting a track width of a utility vehicle comprising at least a first wheel-mounting assembly of any one of Embodiment 1 through Embodiment 14 and a second wheel-mounting assembly of any one of Embodiment 1 through Embodiment 14, the method comprising extending each of the actuators of the first and second telescopic axle assemblies of the first wheel-mounting assembly simultaneously, and extending each of the actuators of the first and second telescopic axle assemblies of the second wheel-mounting assembly simultaneously.

Embodiment 20

The method of Embodiment 19, further comprising maintaining the first and second telescopic axle assemblies of the first wheel-mounting assembly parallel to one another, and maintaining the first and second telescopic axle assemblies of the second wheel-mounting assembly parallel to one another.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A wheel-mounting assembly for a utility vehicle comprising a chassis, the wheel-mounting assembly comprising:
   first and second telescopic axle assemblies laterally spaced from one another and each secured to the chassis, wherein the first and second telescopic axle assemblies each comprise an actuator arranged to control extension and retraction of a respective telescopic axle assembly; and
   a wheel support assembly coupled to outboard ends of each of the first and second telescopic axle assemblies;
   wherein the outboard end of the first telescopic axle assembly is coupled to the wheel support assembly by a link arm having a first end coupled to the first telescopic axle assembly by a first pivotable connection and a second, opposite end coupled to the wheel support assembly by a second pivotable connection; and
   wherein the outboard end of the second telescopic axle assembly is coupled directly to a crank arm by a third pivotable connection, and the crank arm is rigidly connected to the wheel support assembly.

2. The assembly of claim 1, wherein the first and second telescopic axle assemblies are aligned parallel to one another.

3. The assembly of claim 2, wherein one of the first pivotable connection and the second pivotable connection comprises a ball-and-socket joint.

4. The assembly of claim 1, wherein at least one of the first and second telescopic axle assemblies comprises an outer axle portion and an inner axle portion slideably received by the outer axle portion.

5. The assembly of claim 4, wherein the outer axle portions of each of the first and second telescopic axle assemblies are fixed to the chassis.

6. The assembly of claim 4, wherein the outer axle portions each comprise a plurality of bearings secured within an outer tube, wherein the bearings receive and support a respective inner axle portion in a sliding relationship.

7. The assembly of claim 6, wherein the bearings each comprise an adjustable pillow block.

8. The assembly of claim 4, wherein the inner axle portion comprises a portion of a hydraulic actuator.

9. The assembly of claim 8, wherein the hydraulic actuator comprises a piston connected to the outer axle portion or the chassis.

10. The assembly of claim 4, wherein the inner axle portion comprises a tubular member, and wherein the respective actuator comprises a hydraulic actuator connected between the tubular member and the outer axle portion.

11. The assembly of claim 10, wherein the hydraulic actuator is mounted to an outside surface of the tubular member.

12. The assembly of claim 1, wherein each of the first and second telescopic axle assemblies are configured to transfer a portion of a weight of the chassis to the wheel support assembly.

13. The assembly of claim 1, wherein the first telescopic axle assembly is rigidly fixed to the second telescopic axle assembly.

14. A utility vehicle comprising:
   a chassis; and
   a plurality of wheel-mounting assemblies coupled to the chassis, each wheel-mounting assembly comprising:
      first and second telescopic axle assemblies laterally spaced from one another and each secured to the chassis, wherein the first and second telescopic axle assemblies each comprise an actuator arranged to control extension and retraction of a respective telescopic axle assembly; and a wheel support assembly coupled to outboard ends of each of the first and second telescopic axle assemblies;

wherein the outboard end of each first telescopic axle assembly is coupled to a respective wheel support assembly by a link arm having a first end coupled to the first telescopic axle assembly by a first pivotable connection and a second, opposite end coupled to the respective wheel support assembly by a second pivotable connection; and wherein the outboard end of each second telescopic axle assembly is coupled directly to a crank arm by a third pivotable connection, and the crank arm is rigidly connected to the respective wheel support assembly.

15. The utility vehicle of claim 14, further comprising a steering control system arranged to control steering movement of the wheel support assembly with respect to the chassis, wherein, in response to a steering control command, the steering control system is configured to simultaneously extend a first of the actuators and retract a second of the actuators so as to pivot the wheel support assembly around a steering axis.

16. The utility vehicle of claim 15, wherein, in response to a track-increase command, the steering control system is configured to simultaneously extend both actuators to move the wheel support assembly further from the chassis.

17. The utility vehicle of claim 14, wherein the utility vehicle comprises a self-propelled agricultural sprayer.

18. A method of adjusting a track width of a utility vehicle, the method comprising:
   providing a utility vehicle comprising:
      a chassis; and
      a plurality of wheel-mounting assemblies coupled to the chassis, each wheel-mounting assembly comprising:
         first and second telescopic axle assemblies laterally spaced from one another and each secured to the chassis, wherein the first and second telescopic axle assemblies each comprise an actuator arranged to control extension and retraction of a respective telescopic axle assembly; and
         a wheel support assembly coupled to outboard ends of each of the first and second telescopic axle assemblies;
   wherein the outboard end of each first telescopic axle assembly is coupled to a respective wheel support assembly by a link arm having a first end coupled to the first telescopic axle assembly by a first pivotable connection and a second, opposite end coupled to the respective wheel support assembly by a second pivotable connection; and
   wherein the outboard end of each second telescopic axle assembly is coupled directly to a crank arm by a third pivotable connection, and the crank arm is rigidly connected to the respective wheel support assembly;
   simultaneously extending the first and second telescopic axle assemblies secured to a first wheel support assembly; and
   simultaneously extending the first and second telescopic axle assemblies secured to a second wheel support assembly.

19. The method of claim 18, further comprising:
maintaining the first and second telescopic axle assemblies secured to the first wheel support assembly parallel to one another; and
maintaining the first and second telescopic axle assemblies secured to the first wheel support assembly parallel to one another.

\* \* \* \* \*